United States Patent [19]

MacMaster

[11] 4,008,615
[45] Feb. 22, 1977

[54] TEMPERATURE AVERAGING DEVICE

[75] Inventor: Malcolm D. MacMaster, Washington Crossing, Pa.

[73] Assignee: Emhart Industries, Inc., Farmington, Conn.

[22] Filed: Apr. 28, 1975

[21] Appl. No.: 572,252

[52] U.S. Cl. .............................. 73/343 R; 62/126; 73/349; 165/105
[51] Int. Cl.² ...................... F25B 49/00; G01K 1/16
[58] Field of Search ............. 73/343 R, 349, 368.2, 73/362.8, 344, 295, 343; 62/125, 126; 165/105

[56] References Cited
UNITED STATES PATENTS

| | | | |
|---|---|---|---|
| 2,158,059 | 5/1939 | Haines | 62/125 X |
| 2,504,588 | 4/1950 | Rinia | 165/105 X |
| 3,059,443 | 10/1962 | Garner | 73/349 X |
| 3,433,929 | 3/1969 | Snelling | 165/105 X |
| 3,544,276 | 12/1970 | Merwitz | 62/125 X |
| 3,566,676 | 3/1971 | Hays | 165/105 |

Primary Examiner—Richard C. Queisser
Assistant Examiner—Daniel M. Yasich
Attorney, Agent, or Firm—Sperry and Zoda

[57] ABSTRACT

A temperature sensing device including a conduit or tubular section acting as a condenser extending throughout the interior of a refrigerated environment such as a refrigerated food case with an evaporator section extending to a collection pot located remote from the condenser tube such as under the shelving of freezer cases, the entire tubular section being hermetically sealed with respect to the ambient and filled with refrigerant in fluid flow communication with the collection pot which serves as a reservoir for the refrigerant, the refrigerant in the condenser section acting to assume the average temperature reading in the case environment and communicating the reading to the collection pot which has therein a sensing well located below the level of liquid refrigerant in the pot so that a temperature sensing probe, such as a thermistor device, when placed in the well will remotely and accurately monitor the refrigeration requirements of the food case to maintain a predetermined desired average temperature therein.

9 Claims, 2 Drawing Figures

TEMPERATURE AVERAGING DEVICE

BACKGROUND OF THE INVENTION

1. Field of the Invention

This invention deals with the problems associated with very accurate control of the temperature of a food case or other refrigerated environment. In certain applications it is desirable to maintain extremely close tolerances on the refrigerated temperature in order to allow the temperature reading to be lowered as much as possible and yet still be sure that a certain absolute minimum temperature will be observed.

For example, if the items stored in a refrigerated environment contain water as a constituent and should never be allowed to freeze, then the absolute minimum temperature should be predetermined at approximately 33° F. On the other hand, it is also desirable to maintain the temperature as close as possible to 33° without going lower. Therefore, it becomes necessary to maintain the desired temperature within very close tolerances.

In refrigerated food cases which must be maintained at above 32° F, the above conditions are the exact requirements. It is desirable to cool the case as low as possible without the fear of having one of the many variables cause the freezing of the food product. Many such variables exist such as ambient air temperature, humidity changes, variable lighting loads at day and night, varying customer use, etc. To quickly adapt to such rapid changes in conditions and maintain the temperature within the desired close tolerance limits requires a very rapdily responsive temperature control system.

2. Description of the Prior Art

One element of the present concept makes use of a well-known technological device commonly referred to as a "heat pipe." (The "heat pipe" phenomenon is fully explained in the November, 1968 issue of *Mechanical engineering*) The heat pipe has been used in a wide variety of technologies for the transportation of heat, expecially when the amounts of heat to be transported are very large or when there are confining spacial limitations on the area available for the heat exchange device. Heat pipes have been shown to have much greater heat exchange capacities than the best of metals.

Basically the heat pipe is a closed evacuated chamber with a volatile fluid therein having the desired temperature-pressure relationship at the particular temperature at which it will be operating. The basic theory of operation is that as one end of the chamber is warmed some liquid is thereby vaporized causing the vapor pressure in the proximate region to increase; a slight temporary pressure gradient is created across the gaseous atmosphere in the chamber. Thus, vapor flow is initiated with the warmer vapor flowing to the lower vapor pressure area in the cooler section of the chamber. When the warm vapor reaches the cool zone, it distributes its heat to the surrounding vapor and condenses. This freshly condensed liquid then flows back to the previously warmed section either by gravitational flow or, alternatively, by capillary flow through a wick extending from one end of the chamber to the other end. This vapor flow occurs at a very rapid pace such that in the average heat pipe, the temperature difference from one end to the other is very slight. While most past uses of the heat pipe have been directed to the very favorable characteristic of large heat flow volume, the present invention makes use of the averaging and communicating aspects of the phenomenon which has been largely ignored heretofore in the field of refrigerated food cases. The heat pipe has an inherant ability to average the temperature which it senses along its length and to communicate this average temperature to a remote location. Both of these capabilities are extremely useful in the rapidly responsive control needed for monitoring refrigerated environments.

Many manners of refrigeration control have been used to attempt to closely control the temperature tolerances but none have been able to overcome the variables introduced by the wide variations in operating conditions to which refrigerated food cases are exposed. One of the foremost attempts has been a two-stage system which, firstly, places a thermistor device in the primary air discharge area of a standard refrigerated case. In this manner, as the environment temperature increases or decreases the information is electrically conveyed to the refrigerating apparatus. There are several difficulties with this system since external air currents or ambient air humidity could generate a false reading and cause excess or insufficient refrigeration. A problem inherant with this system is that only one small section, the discharge section of the refrigerated environment is being sensed and, as such, small localized variations are not being considered.

The second stage of this system is the off-hours or night control. At night when the store is closed and the case is not being opened and the external air currents are minimal, the great decrease in refrigeration requirements can not be taken into account. The single largest factor is the turning off of the case lights at night which, in and of itself alone, requires a case temperature upward shift of as much as 3° F to prevent freezing. Thus a second overriding control is necessary to shift the thermostat up 3° F during the night.

Even with thus dual means of control, it is apparent that a device for sensing direct product temperature or the direct area temperature of product storage would be desirable. Even though very close control of the discharge air temperature is possible with the two-stage system, the product temperature will change with variations in other variables which are not being effectively monitored such as ambient air temperature and humidity, case light heat, store area air current and customer usage, case service and rear door openings, and varying usage of night covers. These extraneous variables are now able to be sensed by the invention described herein.

SUMMARY OF THE INVENTION

The present invention embodies a closed conduit in the form of a tubular loop or the like hermetically sealed with respect to the ambient and partially filled with refrigerant. The tube is generally classified into two portions, an evaporator section and a condenser section. The condenser section extends throughout the interior of a refrigerated food case or other similar environment wherever temperature control is desired. Most often, the tube runs along the underside of the front edge of the shelves located within the refrigerated food case environment.

The evaporator section refers to that part of the tube which either extends out of the refrigerated environment entirely or at least extends to a warmer area within the refrigerated environment such as under the shelving. The evaporator section terminates at a collection pot which serves as a storage reservoir for the liquid refrigerant. The collection pot also serves as a convenient location remote from the sensed environment where the temperature of the refrigerant can be monitored. The collection pot can be located at any convenient locations such as below the shelving attached to the shelving bracket or elsewhere at a relatively warm location within the refrigerated food case. Preferably a protruding portion of the wall of the collection pot extends inwardly to form a sensing well. The well should be near the bottom of the pot in order to be below the level of the liquid refrigerant therein. In this manner a temperature sensing probe, such as a thermistor device or the like, can be placed in the well to sense the temperature of the liquid refrigerant inside.

The heat pipe phenomenon will cause the liquid and vapor refrigerant to assume the average temperature of the condenser section of the tubular conduit and thereby provide an accurate means for sensing the average temperature in the refrigerated environment.

An object of the present invention is to provide a means for sensing the average temperature throughout a refrigerated environment.

It is another object of the present invention to provide a simple means for communicating a temperature reading to a remote centralized location.

It is another object of the present invention to provide an apparatus for controlling the temperature of a refrigerated environment without unduly altering the temperature thereof.

It is another object of the present invention to provide a device for monitoring refrigeration temperature within extremely close tolerances.

It is another object of the present invention to control wide temperature variations in refrigerated cases caused by ambient air currents, ambient humidity, customer usage, service usage and heat loads from light sources.

It is another object of the present invention to provide a system for sensing product temperature in the immediate area in which the product is being stored in refrigerated cases.

BRIEF DESCRIPTIONS OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a schematic representation of the system for using the present device for temperature averaging and sensing; and FIG. 2 is a cross-sectional view of one embodiment of the averaging circuit when installed below a shelf within a refrigerated case.

DETAILED DESCRIPTION OF THE PREFERRED EMBODIMENT

Figure 1:
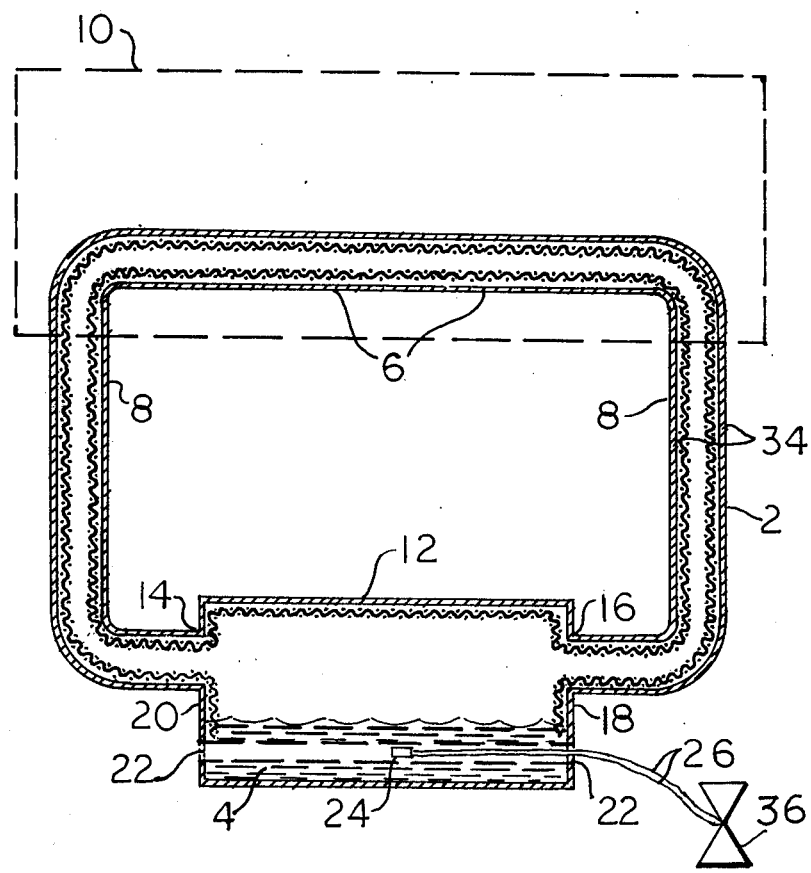

The basic communicating structure in the present invention is the conduit 2 which is hermetically sealed with respect to the ambient and preferably partially filled with liquid and vapor refrigerant, generally designated as 4. The conduit may be chosen with a tubular structure such as a straight tubular section or may be formed as an enclosed tubular loop as shown in FIG. 1.

The tube may be subdivided into two general operative portions, the condenser section 6, which is preferably located along the front edge of shelf 28 or a food case, and the evaporator section 8, which is usually located under the shelf thereby being in a slightly warmer environment. Each section operates with a different function to aid in rapid sensing and communication of temperature information to the sensing apparatus. Basically the condenser section is located throughout the environment which is desired to be refrigerated to a predetermined temperature within very close tolerances. The condensor section 6 need not actually extend throughout the entire length of a case, since a section of as short as 4 feet has been shown to sense effectively in as large as a 12 foot food case. Such a refrigerated food case environment is schematically illustrated in dotted outline FIG. 1 as 10. It is the primary function of condenser tube section 6 to assume the average temperature reading within food case 10 and communicate that reading to the sensing apparatus located within evaporator section 8 indicated under shelf 28. Section 8 and section 6 have full fluid flow communication therebetween.

Evaporator section 8 can have included therein a collection pot 12 which serves as a reservoir for liquid refrigerant. Collection pot 12 is in full fluid flow communication with all sections of tube 2 to facilitate vapor and liquid flow therebetween. In particular evaporator section 8 can enter and exit pot 12 at inlet and outlet ports 14 and 16. If collection pot 12 is chosen with a cylindrical structure as in the present preferred embodiment then ports 14 and 16 can be chosen to be on the flat end sections 18 and 20 such that the normal surface level of refrigerant will be below both ports. In this manner ports 14 and 16 will act as vapor outlet points whenever the vapor pressure within collection pot 12 exceeds the vapor pressure within condenser section 6.

In operation the liquid refrigerant within the collection pot 12 under food shelf 28 will assume the average sensed temperature of the environment within food case 10. The pot can take the form of a separate enlarged container in section 8 as shown in FIG. 1 or can be an arbitrarily designated portion of section 8 which contains liquid refrigerant. Therefore, it is desirable to have a thermal sensing means conveniently located proximate to the liquid refrigerant 4 in pot 12. For this purpose, a sensing well 22 can be provided within collection pot 12 as shown schematically in FIG. 1. Well 22 can actually be any protrusion in the wall of collection pot 12 that enters below the lowest level which the liquid refrigerant will ever assume under any normal operating conditions. In this manner, a temperature sensing probe such as thermistor probe device 24 can be placed within well 22 and sense the temperature of liquid refrigerant 4 which is, in turn, the average temperature sensed by condenser tubing section 6 within the food case environment 10. This temperature reading can then be electrically communicated from thermistor probe 24 by lead lines 26 to any standard rapidly responsive refrigeration apparatus such as a compressor pressure regulator 36 or the like to control the refrigeration of environment 10.

In the steady state the refrigerant 4 is in a partially liquid and partially vapor state. The amount of refrigerant utilized in a particular system is chosen such that under normal operating temperatures the surface level of liquid refrigerant in collection pot 12 will be completely above sensing well 22 qnd completely below inlet and outlet ports 14 and 16. The steady state will be assumed whenever the temperature of the refrigerant at all points within the sealed tube 2 and the sealed collection pot 12 are equal. If, however, the collection pot 12 is placed in slightly warmer environment than the condenser section 6 such as under shelf 28 on bracket 30, then the liquid refrigerant in the pot will start to boil and therefore increase the vapor pressure within the pot and start a movement or circulation of warm vapor to the colder condenser section 6. This movement is caused by the temperature difference between the vapor and liquid refrigerant in the pot 12 and evaporation section 8 when compared with the temperature of the refrigerant liquid and vapor located in the condenser section 6 within the colder air stream. Upon reaching the colder condenser section the warm vapor will cool and cause condensation on the walls of the conduit. This condensation will then flow back to the pot by gravitational force. In this manner, the colder temperature of the liquid refrigerant flowing down the walls of the tube will continually reduce the temperature of the reservoir of liquid refrigerant within the collection pot 12 until all the refrigerant within the entire system has assumed the same temperature which is the average temperature of the food case 10. This vapor flow reaction is rapidly responsive and temperature variations between different points within the system are very small, usually less than 1° F. Thus, the temperature of the liquid refrigerant which is sensed at the collection pot 12 by the thermistor probe device 24 is a very accurate average reading of the average temperature throughout the food case environment 10.

The speed of the response is one of the most desirable qualities of the present system such that as soon as a slightest temperature change occurs within refrigerated environment 10, this variation is immediately assumed by the refrigerant vapor located within condenser section 6 in the form of a temperature difference between it and the pot 12. This speed of response is created by choosing the size of the tubing 2 to be quite small (preferably on the order of ¼ inch to ½ inch in diameter) such that with the limited volume of vapor therein, the total heat capacity will be small. With such a small total heat capacity the condenser section 6 will be able to quickly assume any local temperature variation. Once this occurs an internal temperature and pressure inbalance occurs within the closed refrigerant system since the internal vapor pressure is no longer at equilibrium. The system will then try to reassume the steady state condition.

As an example, if the environment 10 becomes suddenly too cold, being below the predetermined desired setting, the refrigerant vapor within condenser section 6 will become cooler and therefore the vapor pressure therein will decrease. Thus, a pressure difference is created between the cool refrigerant vapor of the food case 10 which is reflected in section 6 and the warm refrigerant vapor below shelf 28 in section 8 and pot 12. In response to this difference, warm vapor will flow from pot 12 and evaporator section 8 to condenser section 6 throughout the food case until the temperatures and pressures in the various sections have equalized. The responsiveness of this action is extremely quick such that the variation between the loop temperature and the thermistor well temperature is usually only a fraction of 1° F. The same temperature interaction takes place in the reverse manner if environment 10 suddenly becomes warmer than desired. In this manner, the temperature of the refrigerant within collection pot 12 will always reflect an accurate reading of the average temperature within refrigerated food case 10 and then provide a convenient point for sensing by the thermister probe device 24. Also since the temperature is taken directly adjacent to all the food product located throughout the refrigerated case, many otherwise uncontrollable variables are being taken into account such as heat from case lights or variations in the store conditions and load. In this respect with a non-freezer store case, it is possible to closely approach the freezing temperature of the product and yet have no fear whatsoever of any changes in the many variables heretofore uncontrollable which might cause freezing of the product.

In further description of the operation of the present invention, it should be appreciated that limited size of the tubular conduit does limit the amount of thermal flow possible there through. In this respect a temperature gradient may exist throughout the temperature sensing system for limited periods of time during fluctuation of the environment temperture. Since the collection pot is located below the section 6, the coldest refrigerant will be within the lowest section of the control system such as within the collection pot itself. Within the collection pot the colder refrigerant will seek the lower levels and thereby achieve temperature stratification within the collection pot specifically and within the system as a whole. It is therefore preferable to locate the sensing well and temperature sensing probe at the bottom of the collection pot 12 as shown in FIG. 1. The temperature sensing probe may also be located along the floor or bottommost part of the collection pot by choosing the location of the sensing well along the bottommost portion of the collection pot. In this respect the probe 24 will sense the coldest temperature existing at any point along the section 6 of the refrigeration conduit. Although the conduit system will attempt to average out the temperature at various points within the environment, it is the coldest temperature which will be communicated to the bottom of the collection pot. It is hence possible to communicate the coldest temperature reading to the probe 24 such that as soon as any point within the refrigerated enfironment achieves a temperature below a predetermined value (such as 32° F) the refrigeration may be terminated. The present system is particularly beneficial for use in food cases in which freezing is undesirable. In such systems the present invention will achieve the lowest possible temperature while at the same time preventing a freezing temperature from existing at any single location throughout the environment. This close and accurate temperature control has not been heretofore achievable.

Figure 2:
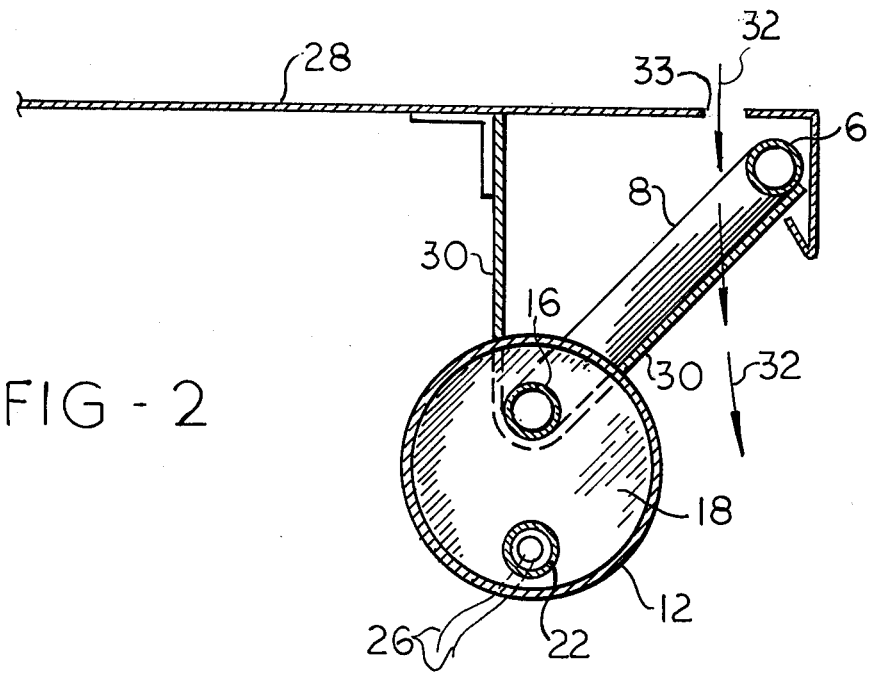

The product will usually be supported upon shelves such as designated generally as 28 in FIG. 2. A common location for positioning the temperature averaging and sensing device is illustrated in FIG. 2 with the collection pot 12 and evaporator tubing section 8 mounted upon bracket 30 which supports the bottom shelf 28 of a group of shelves in a refrigerated food case. The condenser conduit 6 in the form of a loop can be placed immediately under the front edge of the shelf directly in the downward vertical stream of pure air shown generally by arrows 32. In this manner, the opening 33 in shelf 28 will allow the condenser conduit 6 to absorb radiant heat and thereby communicate to the thermistor probe device 24 an accurate average temperature reading. The usual mounting location of pot 12 on bracket 30 is in a slightly warmer location than the condenser tube 6, and therefore a constant flow of refrigerant is assured which facilitates the effective communication of temperature readings from condenser tube 6 to the device 24.

When the temperature of the refrigerent in pot 12 is warmer than the refrigerant in section 6, the flow of the freshly condensed liquid down the walls of the tube and back to the collection pot 12 is made possible by gravitational force since the pot is located lower than any other point of the sealed system. This relationship is also true in the shelf structure shown in FIG. 2 since the bracket 30 will always be below the front edge of shelf 28. However, in some locations where liquid flow may be desired in both directions or where it is necessary to locate the collection pot higher than the condenser section, the system could be made operable by the use of a wick means such as wick 34. Many materials and structures can be utilized by this wick but the main concept is basically that of capillary flow. This phenomenon is caused by the surface tension of the liquid refrigerant when flowing through very narrowly restricted areas. To an extent the capillary flow will be strong enough to overcome gravitational force in the opposite direction. The wick can be a small tubing or merely a meshing or the like and can be located along the inside walls of the refrigeration tube or down the center of the tube depending on structural convenience. The theory is basically that of standard capillary flow.

The choice of refrigerant is important since the chosen liquid must have a boiling point under atmospheric conditions which is below the lowest possible operational temperature of the system. For example, water would provide an excellent refrigerent if the operational temperature of the system would never go below 212° F. Also critical is the volume of refrigerent placed in the system when initially charged. Preferably enough refrigerent is used such that in the steady state the surface level of liquid refrigerent in pot 12 is above the sensing well 22 and below the inlet and outlet ports 14 and 16.

While the particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A temperature averaging and sensing device for use with a refrigeration control system for monitoring refrigeration requirements of a food case or other selected environment which comprises:
    a. a hermetically sealed refrigeration conduit such as a closed loop tube partially filled with refrigerant, which comprises:
        1. an elongated condenser section located directly within the refrigerated environment; and
        2. an evaporator section in full fluid flow communication with said condenser section;
    b. a collection pot for the liquid refrigerant which will assume the average temperature sensed in the refrigerated environment and located below and between said condenser section and said evaporator section and connected to be in full fluid flow communication therewith, said collection pot providing a storage location for the coldest liquid refrigerant and being hermetically sealed from the ambient, said pot being located within said evaporator section of said refrigeration conduit;
    c. a sensing well attached to and positioned towards the bottom of said collection pot for providing a location for sensing the temperature of refrigerant in the bottom of said pot, said well being hermetically sealed with respect to the interior of said collection pot; and
    d. a temperature sensing probe located within said well in the bottom of said collection pot for sensing the temperature of refrigerant located within the bottom of said collecting pot as an indication of the average of the temperatures sensed throughout the refrigerated environment.

2. The device as defined in claim 1 further including a wick means to aid the movement of refrigerant from said condenser section to said collection pot by means of capillary flow.

3. The device as defined in claim 1 wherein said condenser section of said refrigeration tube extends along substantially the complete length and width of the refrigerated environment to be exposed to all ranges of temperature within the environment in order to communicate the temperature therein to the probe located at the bottom of said collection pot.

4. The device as defined in claim 1 wherein said collection pot defines an inlet port and an outlet port and said refrigeration conduit is of a loop structure, one end of which terminates at said inlet port and one end of which terminates at said outlet port with said inlet port and said outlet port providing fluid flow communication between said collection pot and said conduit.

5. The device as defined in claim 4 wherein said inlet port and said outlet both being located above the surface of the normal storage level of liquid refrigerant in said collection pot.

6. The device as defined in claim 1 wherein said sensing well is positioned at the bottom of said collection pot such that under normal operating conditions the level of refrigerant in said collection pot is above the level of said sensing well in order to effectively communicate the temperature reading of the refrigerant to said probe located in said sensing well.

7. The device as defined in claim 1 wherein said collection pot is of a cylindrical structure with said sensing well extending therethrough from one flat surface of said pot to the other flat surface of said pot to facilitate insertion of said sensing probe from either end.

8. The device as defined in claim 7 wherein said probe is easily removable to facilitate replacement and relocation thereof.

9. The device as defined in claim 1 wherein said temperature sensing probe is a thermistor device.

* * * * *